United States Patent
Ochoa Gómez et al.

(10) Patent No.: US 12,195,491 B2
(45) Date of Patent: Jan. 14, 2025

(54) LIGNIN-BASED POLYOLS

(71) Applicant: FUNDACION TECNALIA RESEARCH & INNOVATION, Donostia—San Sebastián (ES)

(72) Inventors: José Ramón Ochoa Gómez, Vitoria-Gasteiz (ES); Jonatan Pérez Arce, Vitoria-Gasteiz (ES); Belén Maestro Madurga, Vitoria-Gasteiz (ES); Eduardo José García Suárez, Vitoria-Gasteiz (ES)

(73) Assignee: FUNDACION TECNALIA RESEARCH & INNOVATION, Donostia—San Sebastián (ES)

( * ) Notice: Subject to any disclaimer, the term of this patent is extended or adjusted under 35 U.S.C. 154(b) by 832 days.

(21) Appl. No.: 17/296,476

(22) PCT Filed: Nov. 28, 2019

(86) PCT No.: PCT/EP2019/082897
§ 371 (c)(1),
(2) Date: May 24, 2021

(87) PCT Pub. No.: WO2020/109460
PCT Pub. Date: Jun. 4, 2020

(65) Prior Publication Data
US 2022/0024959 A1    Jan. 27, 2022

(30) Foreign Application Priority Data
Nov. 29, 2018    (EP) .................................... 18382869

(51) Int. Cl.
*C07G 1/00* (2011.01)
*C08G 18/64* (2006.01)

(52) U.S. Cl.
CPC ........... *C07G 1/00* (2013.01); *C08G 18/6492* (2013.01)

(58) Field of Classification Search
CPC .............................. C07G 1/00; C08G 18/6492
USPC ......................................................... 530/502
See application file for complete search history.

(56) References Cited

U.S. PATENT DOCUMENTS

| 3,905,926 | A | * | 9/1975 | D'Alelio | ................ C08G 59/02 530/502 |
| 2007/0260046 | A1 | * | 11/2007 | Tomita | ................... C09K 23/50 530/500 |

FOREIGN PATENT DOCUMENTS

| CN | 103772693 A |   | 5/2014 |   |
| CN | 104693406 A | * | 6/2015 | .......... C08G 18/348 |
| EP | 2809677 B1 |   | 12/2014 |   |
| FR | 2697256 A1 |   | 4/1994 |   |
| WO | WO 2010/020903 A1 |   | 2/2010 |   |

(Continued)

OTHER PUBLICATIONS

Kaiho et al., WO 2016/207711 A1 machine translation in English, Dec. 29, 2016. (Year: 2016).*

(Continued)

*Primary Examiner* — David T Karst
(74) *Attorney, Agent, or Firm* — Squire Patton Boggs (US) LLP

(57) ABSTRACT

The present invention relates to a process to manufacture lignin-based polyols (LBP) by ring opening polymerization (ROP) of oxiranes in the presence of lignin and in an organic solvent or mixture thereof using acidic catalysts. The LBP are suitable to manufacture polyurethanes, polycarbonates and polyesters.

17 Claims, 4 Drawing Sheets

(56) References Cited

FOREIGN PATENT DOCUMENTS

WO    WO 2013/113462 A1    8/2013
WO    WO-2016207711 A1 * 12/2016 ........... C07D 319/06

OTHER PUBLICATIONS

Ren et al., CN 104693406 A machine translation in English, Jun. 10, 2015. (Year: 2015).*
International Search Report and Written Opinion mailed Feb. 13, 2020 for International Application No. PCT/EP2019/082897, 10 pages.
Cateto, et al: "Optimization Study of Lignin Oxypropylation in view of preparation of Polyurethane Rigid Foams", Industrial and Engineering Chemistry Research; Feb. 2, 2009; vol. 48, pp. 2583-2589.
Lora, et al: "Recent Industrial Applications of Lignin: A Sustainable Alternative to Nonrenewable Materials", Journal of Polymers and the Environment; Apr. 2002; vol. 10, Nos. 1-2, pp. 39-48.
Standard Test Method for Hydroxyl Groups Using Reaction with $p$-Toluenesulfonyl Isocyanate (TSI) and Potentiometric Titration with Tetrabutylammonium Hydroxide; ASTM International; Designation E-1899-02; Dec. 2002, 5 pages.

\* cited by examiner

LIGNIN-BASED POLYOLS

CROSS-REFERENCE

This application is a 35 USC 371 national phase filing of PCT/EP2019/082897 filed on Nov. 28, 2019, which claims the benefit of and priority to European Patent Application EP18382869.8 filed on Nov. 29, 2018, both applications are incorporated herein by reference in their entirety.

TECHNICAL FIELD

The present invention is related to a process to manufacture lignin-based polyols (LBP) by ring opening polymerization (ROP) of oxiranes in the presence of lignin and in an organic solvent or mixture of organic solvents using acidic catalysts. The LBP are suitable to manufacture polyurethanes and, polycarbonates and polyesters.

BACKGROUND ART

LBP obtained by reaction of lignin with oxiranes are well known in the art, for instance to be used in the synthesis of polyurethanes by reaction with isocyanates. They have been synthesized to overcome the low reactivity of the lignin hydroxyl moieties sterically hindered because they are entrapped within the rigid crosslinked lignin structure. The introduction into the lignin structure of branches, consisting of ether units, by ROP of oxiranes in the presence of lignin, as shown in Scheme 1, allows the hydroxyl groups to be far away from the lignin core, becoming more accessible, thereby increasing their reactivity. At the same time, the solid lignin is converted into a liquid polyol at temperatures between room temperature and 60-70° C., making it more suitable for industrial purposes.

Scheme 1. LBP obtained by ROP of oxiranes in the presence of lignin

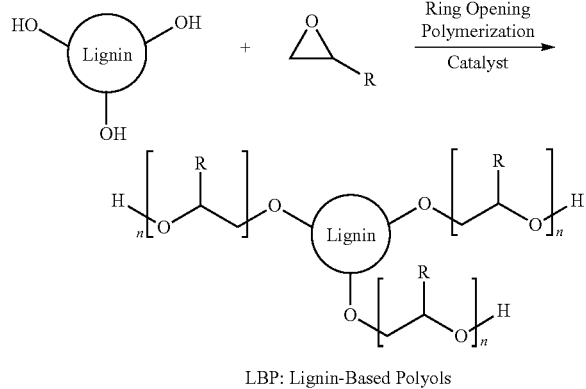

LBP: Lignin-Based Polyols

All documents in the prior art teach that LBP are manufactured by ROP of oxiranes in the presence of lignin under basic catalysis either in the presence or not of water. See, CN103772693, WO2013/113462 A1, WO 2010/020903 A1 in the patent literature, Cateto et al. (Optimization Study of Lignin Oxypropylation in View of the Preparation of Polyurethane Rigid Foams. *Industrial & Engineering Chemistry Research*, 2009, 48, 2583-2589) and Lora and Glasser (Recent Industrial Applications of Lignin: A Sustainable Alternative to Nonrenewable Materials. *Journal of Polymers and the Environment*, 2002, 10, 39-48) in the scientific literature.

However, the processes of the prior art have several drawbacks, such as that the reaction temperature is above 80° C., generally above 100° C. reaching values as high as 180° C. For one of the more used oxiranes, propylene oxide, this high reaction temperature involves working above its boiling point resulting in a reaction which is carried out under pressure, thereby increasing the production costs; and, more importantly, homopolymerization always occurs as stated in WO2013/1134662 A1. Therefore, the final product consists of a mixture of an oxyalkylated lignin and a homopolymer derived from the corresponding oxirane.

Consequently, there is a need in the art for processes to manufacture LBP avoiding the above-mentioned drawbacks.

SUMMARY OF INVENTION

Inventors have provided an improved method for the production of lignin-based polyols by cationic ring opening polymerization of oxiranes instead of by anionic ring opening polymerization disclosed in the state of the art. In particular, the present inventors have surprisingly found that using a cationic ring opening polymerization of oxiranes in the presence of lignin in one or more organic solvents catalysed by an acidic catalyst allows producing lignin-based polyols under mild reaction conditions.

Performing the method under mild reaction conditions (i.e. temperature and pressure) allows reducing the production costs, favouring the industrial scaling-up and also reducing the synthesis of the oxirane homopolymer by-product. Therefore, the method of the invention allows obtaining lignin-based polyols substantially free of oxirane homopolymer without compromising the conversion and the increasing the production cost.

Furthermore, The LBP of the present invention can be used in the industrial synthesis of polymers, such as polyesters, polycarbonates and polyurethanes, in which polyols are key reactants for their manufacturing. In particular, the method of the present invention is also advantageous because the LBP thus obtained are highly reactive in the preparation of polyurethanes by reaction with isocyanates.

Therefore, the process of the invention allows overcoming the drawbacks of the manufacture of LBP disclosed in the state of the art as it is shown in the examples. Thus, the invention provides a process to manufacture lignin-based polyols comprising the following steps:
a) Dissolving lignin and an acidic catalyst in an organic solvent or a mixture thereof;
b) Adjusting the temperature of solution obtained in step a) at a value from −15° C. to 60° C. under stirring;
c) Adding continuously an oxirane or a solution of an oxirane in an organic solvent or a mixture thereof, on the solution obtained in step b) at a flow rate from 0.01 and 1.0 L-oxirane/h/kg-lignin,
d) Keeping the reaction mixture obtained in step c) after addition completion for an appropriate time;
e) Neutralizing the catalyst by adding an appropriate amount of a base on the reaction mixture obtained in step d); and
f) Isolating the lignin-based polyols from the mixture obtained in step e).

DETAILED DESCRIPTION OF THE INVENTION

Figure 1:
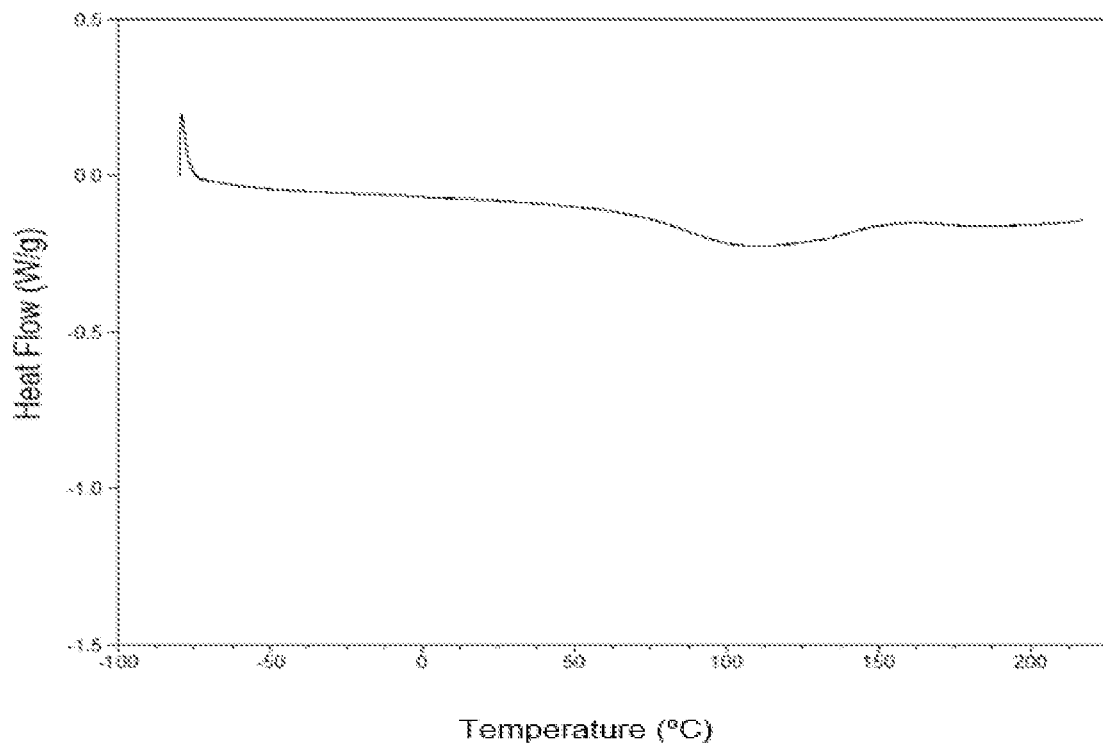
FIG. 1 is a DSC thermogram of the lignin used in the Examples of the present invention. The thermogram is a plot of the variation of heat flow (W/g) versus temperature (° C.).

All terms as used herein in this application, unless otherwise stated, shall be understood in their ordinary meaning as known in the art. More specific definitions for certain terms as used in the present application are as set forth below and are intended to apply uniformly throughout the specification and claims unless an otherwise expressly set out definition provides a broader definition.

For purposes of the present invention, the given ranges include both the lower and the upper end-points. Ranges such as temperatures, times, and the like, should be considered approximate, unless specifically stated.

The terms "percentage (%) by weight", "% by weight" or "wt %" are used interchangeably and they refer to the percentage of a compound in relation to the total weight of the lignin-based polyols. For example, the percentage of the oxirane homopolymer in relation to the total weight of the lignin-based polyols.

The term "molar ratio" refers to the number of moles of a compound with respect to the number of moles of another compound or to the number of moles of a moiety of another compound. For example, in the context of the invention, "molar ratio" refers to the number of moles of the oxirane compound with respect to the moles of the hydroxyl moieties in the lignin.

As it is mentioned above, the aspect of the invention is a process to manufacture LBP by ROP of oxiranes in the presence of lignin in an organic solvent or mixture of organic solvents using acidic catalysts.

As used herein, the term "lignin" encompasses both lignin and tannins as well as any other fraction containing hydroxyl moieties obtained from lignin depolymerization. The lignin to be used in the process of the present invention can result from any source of lignin and can be obtained from any of the processes known in the art, such as, but not limited to, softwood lignin consisting exclusively of coniferyl alcohol, hardwood lignin consisting mainly of coniferyl alcohol and sinapyl alcohol, grass lignin having coniferyl, sinapyl and p-coumaryl alcohol, Klason lignin obtained as an insoluble residue after treating the lignin source with 72% aqueous sulphuric acid, kraft lignin obtained from the kraft process for conversion of wood into wood pulp, organosolv lignin obtained by delignification of lignocellulosics using an organic solvent or an aqueous organic solvent under heating, and alkali lignin obtained by lignocellulosics delignification with an aqueous alkali solution under heating.

In an embodiment, the process of the invention provides LBP substantially free of oxirane homopolymers. As herein used, the term "lignin-based polyols substantially free of oxirane homopolymers" means that the amount of homopolymers in the LBP of the present invention is equal or less than 5 wt % as determined by the method described below. In an embodiment, the process of the invention provides LBP having an amount of homopolymers in the LBP equal or less than 4 wt %, preferably equal or less than 3.5 wt %.

In an embodiment, the process of the invention provides LBP having an amount of homopolymers in the LBP from 0.1 to 4 wt %; preferably from 0.25 to 3.5 wt %.

The method of the invention which comprises the cationic ROP of oxiranes in the presence of lignin is advantageous because it can be done in batch or semicontinuous mode. In an embodiment, the process of the invention is performed in semicontinuous mode by adding slowly under stirring a solution of the oxirane, dissolved in an organic solvent or a mixture of organic solvents, on a solution of lignin in an organic solvent or a mixture of organic solvents containing an acidic catalyst.

In an embodiment, the process is that wherein the oxirane and the LBP obtained are those in which R in Scheme 1 is (the name of the oxirane is stated within the brackets) selected from the group consisting of H— (ethylene oxide), $CH_3$— (propylene oxide), $CH_3$—$CH_2$— (butylene oxide), $ClCH_2$— (epichlorohydrin), $BrCH_2$— (epibromohydrin) and $HOCH_2$— (glycidol). Thus, the process of the invention is that wherein the oxirane is selected from the group consisting of ethylene oxide, propylene oxide, butylene oxide, epichlorohydrin, epibromohydrin and glycidol.

Organic solvents suitable to perform the process of the present invention are those in which both the lignin and the oxirane are soluble at temperatures equal to or lower than 60° C. In an embodiment, the process of the invention is that wherein the organic solvent is selected from the group consisting of tetrahydrofuran, tetrahydrofuran/acetonitrile, tetrahydrofuran/dichloromethane, tetrahydrofuran/trichloromethane, 1,4-dioxane, 1,4-dioxane/dichloromethane, 1,4-dioxane/acetonitrile, 1,4-dioxane/trichloromethane, tetrahydropyran, tetrahydropyran/acetonitrile, tetrahydropyran/dichloromethane, tetrahydropyran/trichloromethane, 2-methyltetrahydrofuran, 2-methyltetrahydrofuran/acetonitrile, 2-methyltetrahydrofuran/dichloromethane, 2-methyltetrahydrofuran/trichloromethane, and mixtures thereof.

In an embodiment, the process of the invention is that wherein the organic solvent is tetrahydrofuran, tetrahydrofuran/acetonitrile, tetrahydrofuran/dichloromethane, tetrahydrofuran/trichloromethane, tetrahydropyran, tetrahydropyran/acetonitrile, tetrahydropyran/dichloromethane and tetrahydropyran/trichloromethane. The above cyclic-ether-type solvents and mixtures thereof do not undergo ROP in the presence of lignin and an acidic catalyst. However, surprisingly, the present inventors have found that they copolymerize with oxiranes when the oxiranes are added to the solution of lignin and an acidic catalyst in such solvents, as exemplified in Scheme 2 for THF, wherein R has the same meaning as previously indicated. The use of these cyclic-ether-type organic solvents is advantageous because improve some properties of the LBP of the present invention, such as:

i) To control the length of the polyether chains attached to the lignin core, and consequently the molecular weight of the LBP which is a known key property of polymers, and ii) To increase the reactivity of terminal hydroxyl groups by decreasing the steric hindrance through the increase in their distance to the rigid and crosslinked lignin core.

In an embodiment, the process of the invention is that wherein in step c) the addition flow rate of the oxirane or the oxirane solution is from 0.02 to 0.7 L-oxirane/h/kg-lignin.

Scheme 2. LBP obtained by cationic ring-opening copolymerization of an oxirane in the presence of lignin in THF as a solvent.

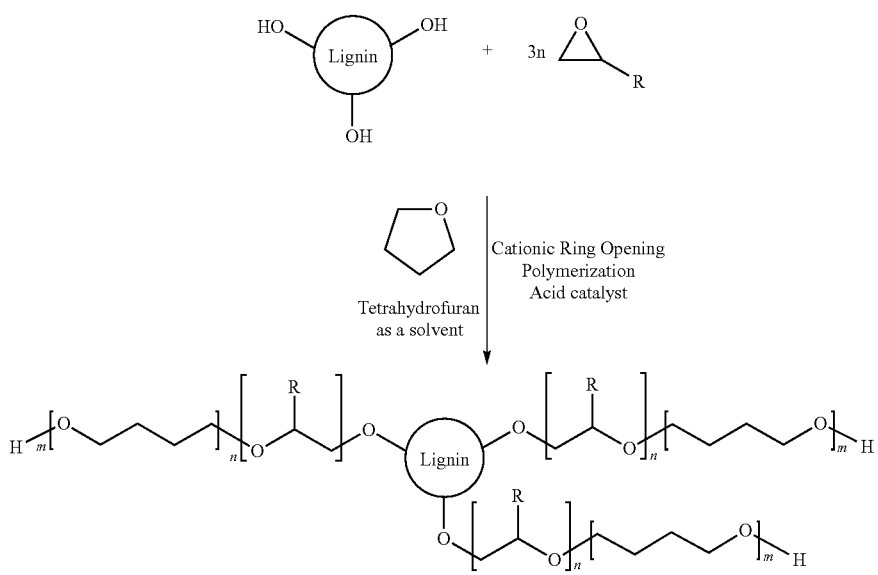

In an embodiment, the process of the invention is that wherein the lignin concentration in the organic solvent or mixture thereof in step a) is from 0.1 g/L to the solubility of lignin at the ROP temperature (i.e. the temperature in steps c) and d)) wherein the ROP is carried out. In an embodiment, the process of the invention is that wherein the lignin concentration is from 15 g/L to the solubility of lignin at the ROP temperature in the organic solvent or mixture thereof wherein the ROP is carried out. The lignin solubility in a solvent at a given temperature can be determined by any method known in the technique. For instance, it can be determined by adding lignin to said solvent at that temperature under stirring until added solids remain insoluble. Then, the mixture is filtered at that temperature and the volume ($V_f$) of filtrate is measured. Then, the filtrate is evaporated under vacuum till dryness, the residue further dried in an oven till constant weight at a temperature 5° C. above the boiling point of solvent, and the residue weighted (m). Lignin solubility in g/L is obtained by dividing m (g) by $V_f$ (L).

In an embodiment, the process of the invention is that wherein the oxirane/(hydroxyl moieties in lignin) molar ratio is from 0.2 to 60. In an embodiment, the process of the invention is that wherein the oxirane/(hydroxyl moieties in lignin) molar ratio is from 0.5 to 40. In an embodiment, the process of the invention is that wherein the oxirane/(hydroxyl moieties in lignin) molar ratio is from 1 to 20. The term the oxirane/(hydroxyl moieties in lignin) molar ratio is related to the amount of total hydroxyl moieties in lignin herein denoted as $OH_L$ (mmol/g).

In an embodiment, the process of the invention is that wherein the temperature in steps c) and d) are from −10 to 60° C. In an embodiment, the process of the invention is that wherein the temperature in steps c) and d) are from 15 to 50° C. In an embodiment, the process of the invention is that wherein the temperature in steps c) and d) are from 15 to 35° C.

In an embodiment, the process of the invention is that wherein step d) is performed for such time needed for having a conversion of oxirane higher than 90%. In an embodiment, the process of the invention is that wherein step d) is performed for such time needed for having a conversion of oxirane higher than 95%. In a particular embodiment, the process of the invention is that wherein step d) is performed for such time needed for having a conversion of oxirane of about 100%. The conversion of oxirane is determined by any appropriate technique known in the state of the art. For purposes of the present invention, it is determined by monitoring the oxirane concentration by HPLC or Gas Chromatography. Usually, step d) of the process of the invention is performed for a period of time from 0.5 h to 4 h.

The acidic catalyst to be used in the process of the present invention is any one of those reported in the literature used for ROP. In an embodiment, process of the present invention is that wherein the acidic catalyst comprises boron trifluoride ($BF_3$). In an embodiment, the process of the invention is that wherein the acidic catalyst is boron trifluoride in gas form. In an embodiment, the process of the invention is that wherein the acidic catalyst is a boron trifluoride complex being the complexing agent selected from the group consisting of ether, ketone, aldehyde, acid anhydride and acid. In an embodiment, the process of the invention is that wherein the boron trifluoride is a complex selected from the group consisting of boron trifluoride dimethyl etherate, boron trifluoride diethyl etherate, boron trifluoride dibutyl etherate, boron trifluoride tetrahydrofuran complex and boron trifluoride acetonitrile complex; particularly boron trifluoride diethyl etherate, boron trifluoride tetrahydrofuran complex and boron trifluoride acetonitrile complex.

In an embodiment, the process of the invention is that wherein the catalyst level is from 0.03 to 0.2 mol/mol OH in lignin. In an embodiment, the process of the invention is that wherein the catalyst level is from 0.06 to 0.15 mol/mol OH in lignin.

Bases to be used in the process of the present invention are any one of those reported in the literature able to neutralize the acidic catalyst. In an embodiment, the process of the invention is that wherein the base is a tertiary amine. In an embodiment, the process of the invention is that wherein the base is selected from the group consisting of trimethylamine, N,N-dimethylethylamine and triethylamine.

In an embodiment, the process of the present invention is that wherein the amount of base in step e) is from 1 to 2 mol per mol of acidic catalyst.

The lignin content in the LBP of the present invention is dependent of the $OH_L$ (mmol-OH/g-lignin), the molecular weight of the oxirane, the moles of oxirane reacted per mol of OH moiety in lignin and the moles of solvent copolymerized with the oxirane. In an embodiment, the process of the invention provides lignin-based polyols having a lignin content from 5 to 90 wt %. In an embodiment, the process of the invention provides lignin-based polyols having a lignin content from 7.5 to 75 wt %. In an embodiment, the process of the invention provides lignin-based polyols having a lignin content from 10 to 60 wt %.

The process of the invention comprises the isolation of the LBP thus obtained. Any technique disclosed in the state of the art for the isolation of lignin-based polyols can be used. In an embodiment, the isolation of LBP obtained in step e) is performed by removing the solvent or the mixture of organic solvents by evaporation. In an embodiment, step (f) is performed under vacuum conditions.

It is also part of the invention, a process to manufacture polyurethanes which comprises performing the process to manufacture lignin-based polyols of the present invention and further reacting the lignin-based polyols thus obtained with one or more isocyanates to obtain polyurethanes.

All the embodiments disclosed above for the process to manufacture the lignin-based polyols of the first aspect of the invention also apply for the process to manufacture polyurethane as defined above.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim and shall not be construed as limiting the scope of the claim. Furthermore, the present invention covers all possible combinations of particular and preferred embodiments described herein.

EXAMPLES

General Considerations

The lignin used in the examples below was an organosolv (ethanol) lignin resulting from a mixture of different woods having a total hydroxyl content of 4.51 mmol/g (hydroxyl number 253 mg-KOH/g), with 73.8%, 21.7% and 4.5% being phenolic OH, aliphatic OH and carboxylic acid OH, respectively. According to Gel Permeation Chromatography (GPC) (see experimental conditions below) it is composed by 4 fractions: 55% of a fraction with an weight average molecular weight (Mw) of 1117 and a polydispersity of 1.35; 14% of a fraction with a Mw of 401 and a polydispersity of 1.01; 20% of a fraction with a Mw of 279 and a polydispersity of 1.02; and 11% of a fraction with a Mw of 159 and a polydispersity of 1.04.

LBPs were characterized as follows:

Lignin percentage was calculated by dividing the initial mass of lignin by the total LBP mass obtained and multiplying the result by 100.

Oxirane percentage was calculated by dividing the difference between the oxirane mass used in the reaction and the unreacted oxirane mass by the total LBP mass obtained and multiplying the result by 100. The unreacted oxirane was determined using a HPLC instrument (Agilent 1260 Infinity) fitted with a 300 mm×7.8 mm×9 μm Aminex HPX-87 column and a refractive index detector. The mobile phase was 0.01N aqueous sulphuric acid and the flow rate 0.7 mL/min. Column and detector temperatures were 65° C. and 50° C., respectively.

Copolymerizable solvent contents were calculated by subtracting the sum of the two above amounts from 100.

Attenuated Total Reflection Fourier Transform Infrared (ATR-FTIR) spectra were recorded using an infrared spectrophotometer Bruker Instrument, model ALPHA-P.

Weight average molecular weights (Mw) and polydispersity indexes (PD) were determined using a GPC Instrument (Varian, PL-GPC 50) fitted with two columns in series (Agilent ResiPore, 7.5×300 mm, 3 μm) and a refractive index detector. The mobile phase was THF with a flow rate of 1 mL/min at 40° C. Calibration was carried out with nine polystyrene standards (Mw: 162-860-1860-2780-6940-13270-19540-74800-281700 g/mol).

Hydroxyl numbers were determined according to ASTM E-1899-02 standard using THF as a solvent.

Differential scanning calorimetry (DSC) was carried out in a TA Instruments Q1000 Modulated Differential Scanning calorimeter. Scans cycles consisted of a cooling ramp between 100° C. and −80° C. and a subsequent heating ramp between −80° C. and 220° C., both at 10° C./min. Previously, the thermal histories of samples were suppressed by heating the samples from −80° C. to 100° C. at 25° C./min.

Homopolymer contents were determined as reported in WO2013/113462 A1 by dissolving an amount of LBP in acetonitrile and extracting the homopolymers in an alkene, such as pentane or hexane, under reflux. After evaporating the alkane, the homopolymer percentage was calculated by multiplying the amount of residue after evaporation by 100 and dividing the result by the LBP mass dissolved in acetonitrile. A sample of the lignin used in the Examples below gave an extraction percentage of 0.6%.

Example 1

Figure 2:
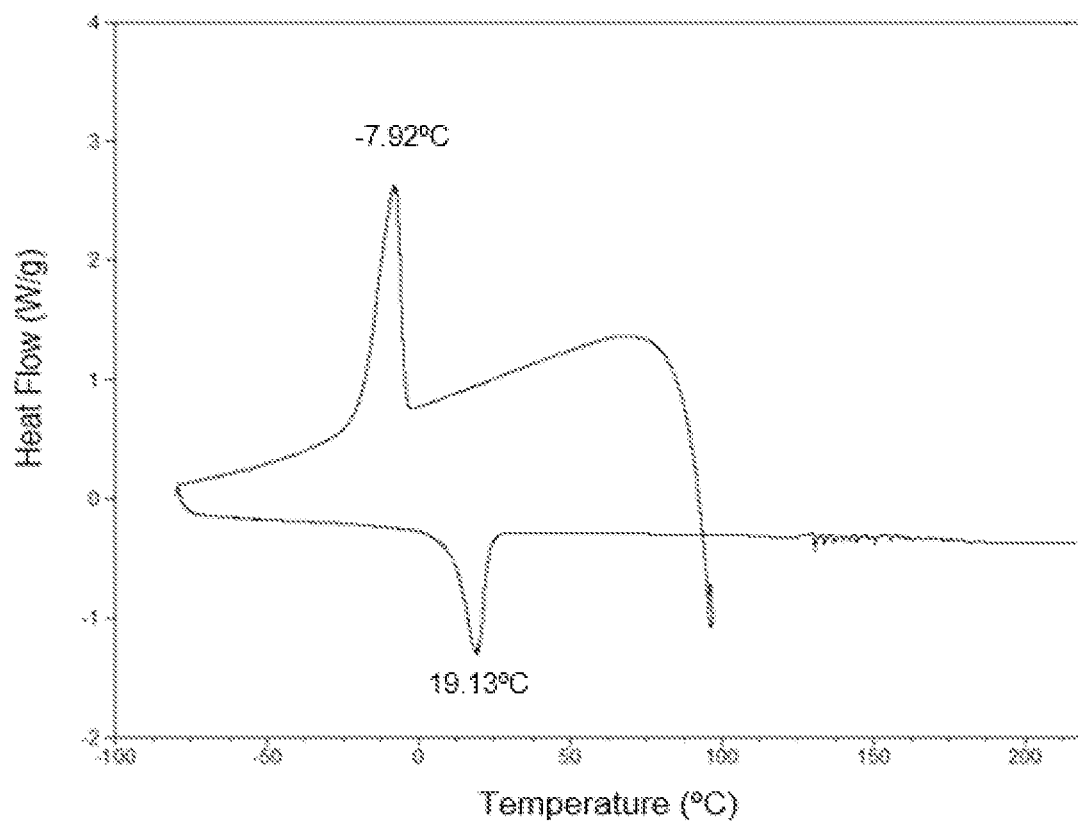
FIG. 2 is a DSC thermogram of the LBP obtained according to the Example 1. The thermogram is a plot of the variation of heat flow (W/g) versus temperature (° C.).

Lignin-Based Polyol Consisting of Lignin, Butylene Oxide Units and Tetrahydrofuran Units Lignin (1.25 g) and THF (63 mL) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ diethyl etherate solution (48 wt % $BF_3$, 86.6 µL) was added. Next, butylene oxide (0.981 mL) was added at a flow rate of 0.412 mL/h by using a syringe pump (KDScientific, Legato 110 Syringe Pump). After addition, the reaction was kept for 1 hour under agitation. Then, the catalyst was neutralized by adding dimethylethylamine (DMEA, 128 µL). The unreacted monomer and the solvent were removed under vacuum at 75° C. until constant weight yielding 12.26 g of a LBP having a hydroxyl number of 87 mg-KOH/g, a Mw of 13907 g/mol, a polydispersity of 1.71, and a composition of: 10.2 wt % lignin, 6.6 wt % butylene oxide units, 83.2 wt % THF units. The homopolymer content was 3%. This LBP presents a melting peak at 19.1° C. and a crystallization peak at −7.92° C. in DSC as shown in FIG. 2. No decomposition peak is observed indicating that this LBP is stable at least up to 220° C.

Example 2

Lignin-Based Polyol Consisting of Lignin, Butylene Oxide Units and Tetrahydrofuran Units As in example 1 but the ROP was carried out at 45° C. The LBP obtained (4.78 g) had a hydroxyl number of 90 mg-KOH/g, a Mw of 4737 g/mol, and a composition of: 26.2 wt % lignin, 7.4 wt % butylene oxide units, 66.4 wt % THF units. The homopolymer content was 4%. This LBP presents a melting peak at 16.0° C. and a crystallization peak at −19.9° C. in DSC. No decomposition peak is observed indicating that this LBP is stable at least up to 220° C.

Example 3

Figure 3:
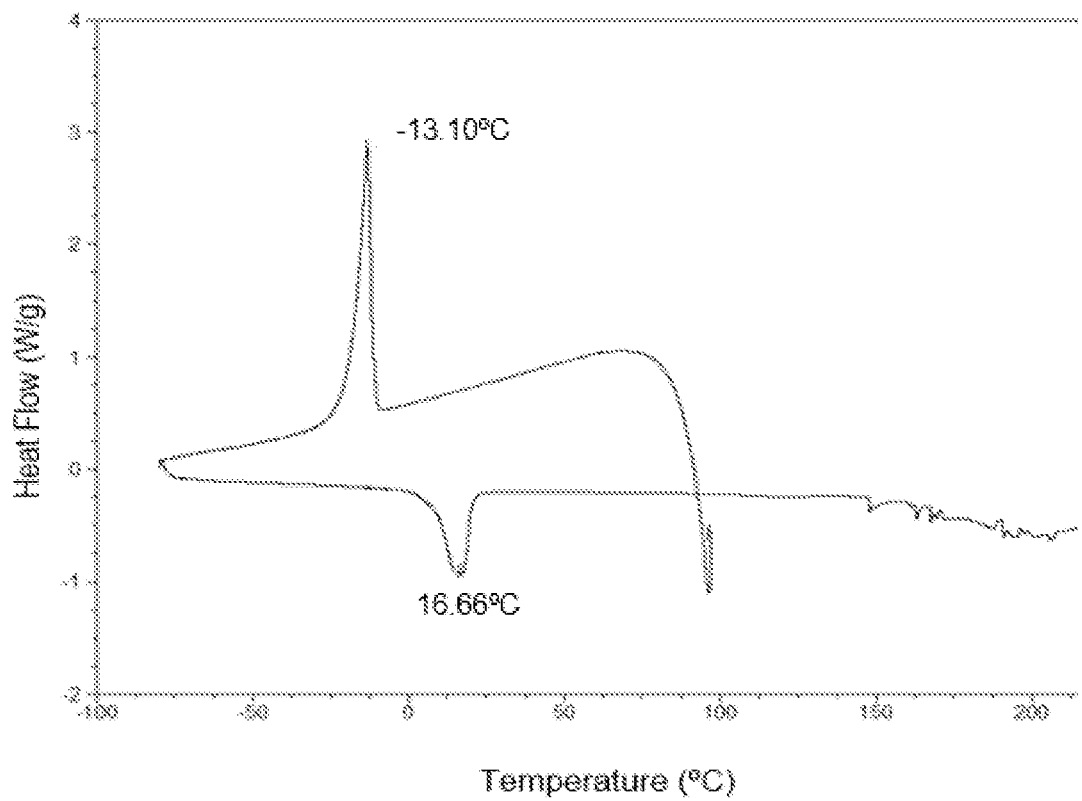
FIG. 3 is a DSC thermogram of the LBP obtained according to the Example 3. The thermogram is a plot of the variation of heat flow (W/g) versus temperature (° C.).

Lignin-Based Polyol Consisting of Lignin, Butylene Oxide Units and Tetrahydrofuran Units As in example 1 but the ROP was carried out at 60° C. The LBP obtained (4.32 g) had a hydroxyl number of 144 mg-KOH/g, a Mw of 4021 g/mol, and a composition of: 28.9 wt % lignin, 8.2 wt % butylene oxide units, 62.9 wt % THF units. The homopolymer content was 5%. This LBP presents a melting peak at 16.66° C. and a crystallization peak at −13.10° C. in DSC as shown in FIG. 3. No decomposition peak is observed indicating that this LBP is stable at least up to 220° C.

Example 4

Figure 4:
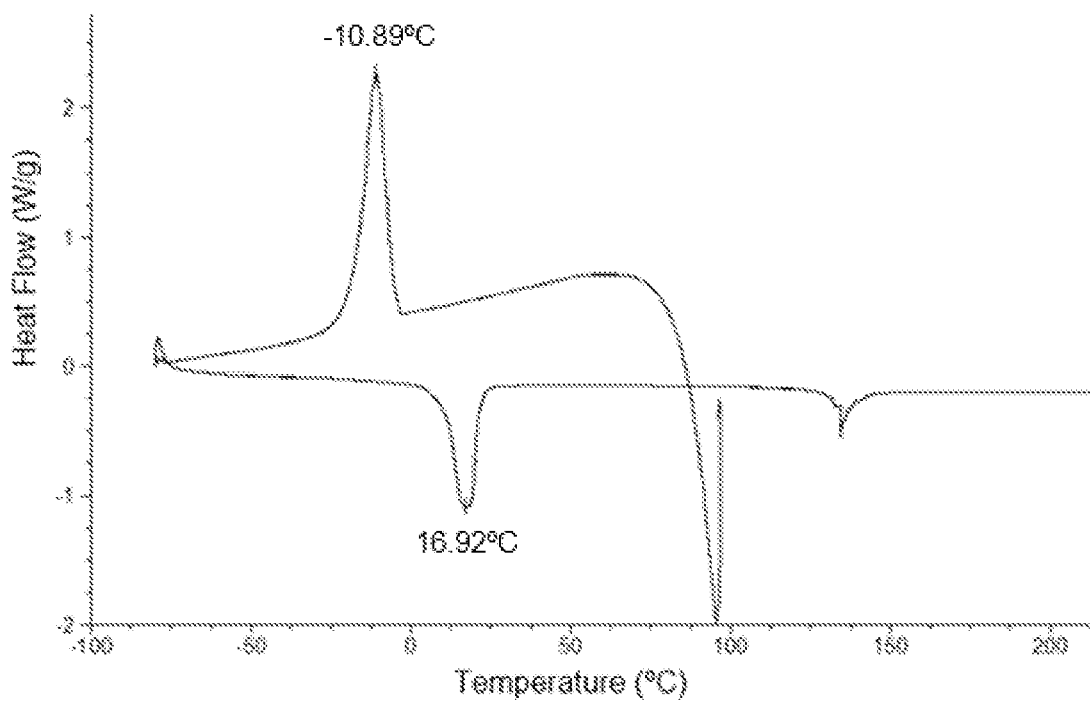
FIG. 4 is a DSC thermogram of the LBP obtained according to the Example 4. The thermogram is a plot of the variation of heat flow (W/g) versus temperature (° C.).

Lignin-Based Polyol Consisting of Lignin, Butylene Oxide Units and Tetrahydrofuran Units As in example 1 but adding 2.5 g of lignin instead 1.25 g. The LBP obtained (11.86 g) had a hydroxyl number of 107 mg-KOH/g, a Mw of 6476 g/mol, a polydispersity of 1.68, and a composition of: 21.1 wt % lignin, 6.8 wt % butylene oxide units, 72.1 wt % THF units. The homopolymer content was 5%. This LBP presents a melting peak at 16.92° C. and a crystallization peak at −10.89° C. in DSC as shown in FIG. 4. No decomposition peak is observed indicating that this LBP is stable at least up to 220° C.

Example 5

Figure 5:
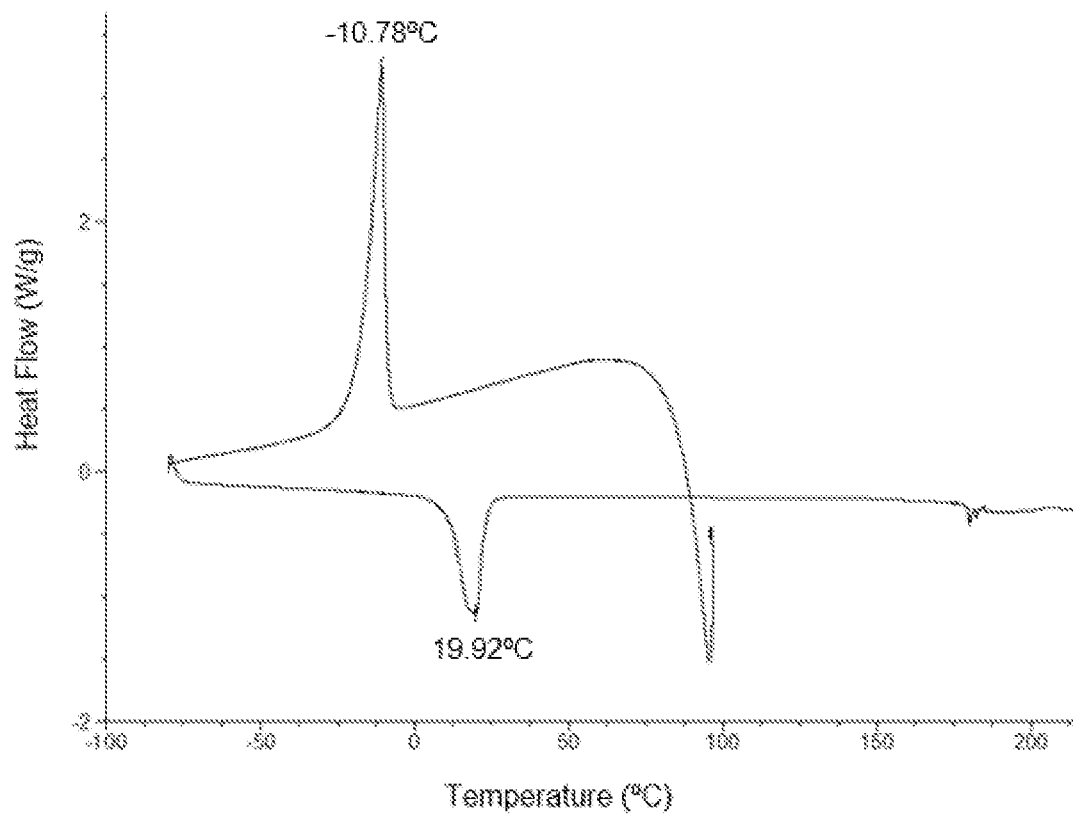
FIG. 5 is a DSC thermogram of the LBP obtained according to the Example 5. The thermogram is a plot of the variation of heat flow (W/g) versus temperature (° C.).

Lignin-Based Polyol Consisting of Lignin, Butylene Oxide Units and Tetrahydrofuran Units in Acetonitrile (ACN) as a Co-Solvent Lignin (1.0 g) and 50 mL of a mixture of THF (72% v/v) and ACN (28% v/v) were added into a 250 mL three-neck round-bottom glass flask fitted with a thermometer and a reflux condenser and placed within a silicone bath in a heating-plate equipment. The mixture was heated at 60° C. under magnetic stirring until a homogeneous solution was obtained. Then, a $BF_3$ diethyl etherate solution (48 wt % $BF_3$, 69.3 µL) was added. Next, butylene oxide (3.923 mL) was added at 0.271 mL/h by using a syringe pump (KDScientific, Legato 110 Syringe Pump). After addition completion, the reaction was kept under agitation 1 hour and then the catalyst was neutralized with DMEA (102 µL). The unreacted monomer and the solvents were removed under vacuum at 75° C. until constant weight yielding 4.55 g of a LBP having a hydroxyl number of 88 mg-KOH/g, a Mw of 12935 g/mol, a polydispersity of 1.80, and a composition of: 22.1 wt % lignin, 7.2 wt % butylene oxide, 70.7 wt % THF units. The homopolymer content was 5%. This LBP presents a melting peak at 19.92° C. and a crystallization peak at −10.78° C. in DSC as shown in FIG. 5. No decomposition peak indicating that this LBP is stable at least up to 220° C.

Example 6

Lignin-Based Polyol Consisting of Lignin, Butylene Oxide Units and Tetrahydropyran (THP) Units Lignin (2.5 g) and THP (125 mL) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ diethyl etherate solution (48 wt % $BF_3$, 173.2 µL) was added. Next, butylene oxide (0.981 mL) was added at 0.823 mL/h by using a syringe pump (KDScientific, Legato 110 Syringe Pump). After addition completion, the reaction was kept for 1 hour under agitation and then the catalyst was neutralized with DMEA (255 µL). The unreacted monomer and the solvent were removed under vacuum at 75° C. until constant weight yielding 4.572 g of a LBP having a hydroxyl number of 230 mg-KOH/g, a Mw of 1174 g/mol, a polydispersity of 1.39, and a composition of: 54.7 wt % lignin, 13.3 wt % butylene oxide units, 32.0 wt % THP units. The homopolymer content was 3%.

Example 7

Lignin-Based Polyol Consisting of Lignin, Butylene Oxide Units and Tetrahydrofuran-Tetrahydropyran Units Lignin (2.5 g) and 125 mL of a mixture of THF (41% v/v) and THP (59% v/v) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ diethyl etherate solution (48 wt % $BF_3$, 173.2 µL) was added. Next, butylene oxide (0.981 mL) was added at 0.823 mL/h by using a syringe pump (KDScientific, Legato 110 Syringe Pump). After addition completion, the reaction was kept for 1 hour under agitation and then the catalyst was neutralized with DMEA (255 µL). The unreacted monomer and the solvents were removed under vacuum at 75° C. until constant weight yielding 4.05 g of a LBP having a hydroxyl number of 227 mg-KOH/g, a Mw of 2211 g/mol, a polydispersity of 1.27, and a composition of: 61.7 wt % lignin, 9.9 wt % butylene oxide units, 28.4 wt % THP-THF units. The homopolymer content was 5%.

Example 8

Lignin-Based Polyol Consisting of Lignin, Butylene Oxide Units and Tetrahydrofuran-Tetrahydropyran Units Lignin (2.5 g) and 125 mL of a mixture of THF (57% v/v) and THP (33% v/v) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ diethyl etherate solution (48 wt % $BF_3$, 173.2 µL) was added. Next, butylene oxide (0.981 mL) was added at 0.823 mL/h by using a syringe pump (KDScientific, Legato 110 Syringe Pump). After addition completion, the reaction was kept for 1 hour under agitation and then the catalyst was neutralized with DMEA (0.255 µL). The unreacted monomer and the solvents were removed under vacuum at 75° C. until constant weight yielding 5.73 g of a LBP having a hydroxyl number of 183 mg-KOH/g, a Mw of 2426 g/mol, a polydispersity of 1.32, and a composition of: 43.6 wt % lignin, 7.6 wt % butylene oxide units, 48.8 wt % THP-THF units. The homopolymer content was 5%.

Example 9

Lignin-Based Polyol Consisting of Lignin, Butylene Oxide Units and 2-Methyltetrahydrofuran Units Lignin (1.25 g) and 2-methyltetrahydrofuran (MeTHF, 63 mL) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ diethyl etherate solution (48 wt % $BF_3$, 86.6 µL) was added. Next, butylene oxide (0.490 mL) was added at 0.412 mL/h by using a syringe pump (KDScientific, Legato 110 Syringe Pump). After addition completion, the reaction was kept for 1 hour under agitation and then the catalyst was neutralized with DMEA (128 µL). The unreacted monomer and the solvent were removed under vacuum at 75° C. until constant weight yielding 1.998 g of a LBP having a hydroxyl number of 185 mg-KOH/g, a Mw of 5470 g/mol, a polydispersity of 2.91, and a composition of: 62.6 wt % lignin, 11.6% butylene oxide units, 25.8 wt % MeTHF units. The homopolymer content was 5%.

Example 10

Lignin-Based Polyol Consisting of Lignin, Propylene Oxide Units and Tetrahydrofuran Units Lignin (1.25 g) and THF (63 mL) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ etherate solution (48 wt % $BF_3$, 86.6 µL) was added. Next, propylene oxide (0.394 mL) diluted in THF (1.57 mL) was added at 0.412 mL/h by using a syringe pump (KDScientific, Legato 110 Syringe Pump). After addition completion, the reaction was kept for 1 hour under agitation and then the catalyst was neutralized with DMEA (128 µL). The unreacted monomer and the solvent were removed under vacuum at 75° C. until constant weight yielding 4.33 g of a LBP having a hydroxyl number of 199 mg-KOH/g, a weight average molecular weight (Mw) of 3016 g/mol, a polydispersity of 1.41, and a composition of: 28.8 wt % lignin, 7.3 wt % propylene oxide units, 63.8 wt % THF units. The homopolymer content was 4%.

Example 11

Lignin-Based Polyol Consisting of Lignin, Glycidol Units and Tetrahydrofuran Units Lignin (1.25 g) and THF (63 mL) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ etherate solution (48 wt % $BF_3$, 86.6 µL) was added. Next, glycidol (0.375 mL) was added at 0.412 mL/h by using a syringe pump (KDScientific, Legato 110 Syringe Pump). After addition completion, the reaction was kept for 1 hour under agitation and then the catalyst was neutralized with DMEA (128 µL). The unreacted monomer and the solvent were removed under vacuum at 75° C. until constant weight yielding 4.00 g of a LBP having a hydroxyl number of 209 mg-KOH/g, a Mw of 3640 g/mol, a polydispersity of 1.51, and a composition of: 31.3 wt % lignin, 10.3 wt % glycidol units, 58.4 wt % THF units.

Example 12

Lignin-Based Polyol Consisting of Lignin, Epichlorohydrin Units and Tetrahydrofuran Units Lignin (1.00 g) and THF (25 mL) were added into a 250 mL three-neck round-bottom glass flask fitted with a thermometer and a reflux condenser and placed within a silicone bath onto a heating-plate equipment. The mixture was heated at 30° C. under magnetic stirring until a homogeneous solution was obtained. Then, a $BF_3$ etherate solution (48 wt % $BF_3$, 69.3 µL) was added. Next, epichlorohydrin (0.354 mL) was added at 0.591 mL/h by using a syringe pump (KDScientific, Legato 110 Syringe Pump). After addition completion, the reaction was kept for 1 hour under agitation and then the catalyst was neutralized with DMEA (102 µL). The unreacted monomer and the solvent were removed under vacuum at 75° C. until constant weight yielding 6.22 g of a LBP having a hydroxyl number of 184 mg-KOH/g, a Mw of 3065 g/mol, a polydispersity of 1.35, and a composition of: 16.1 wt % lignin, 6.5 wt % epichlorohydrin, 77.4 wt % THF units. The homopolymer content was 4%.

Example 13

Polyurethane Consisting of Lignin-Based Poliol Units of the Present Invention

Figure 6:
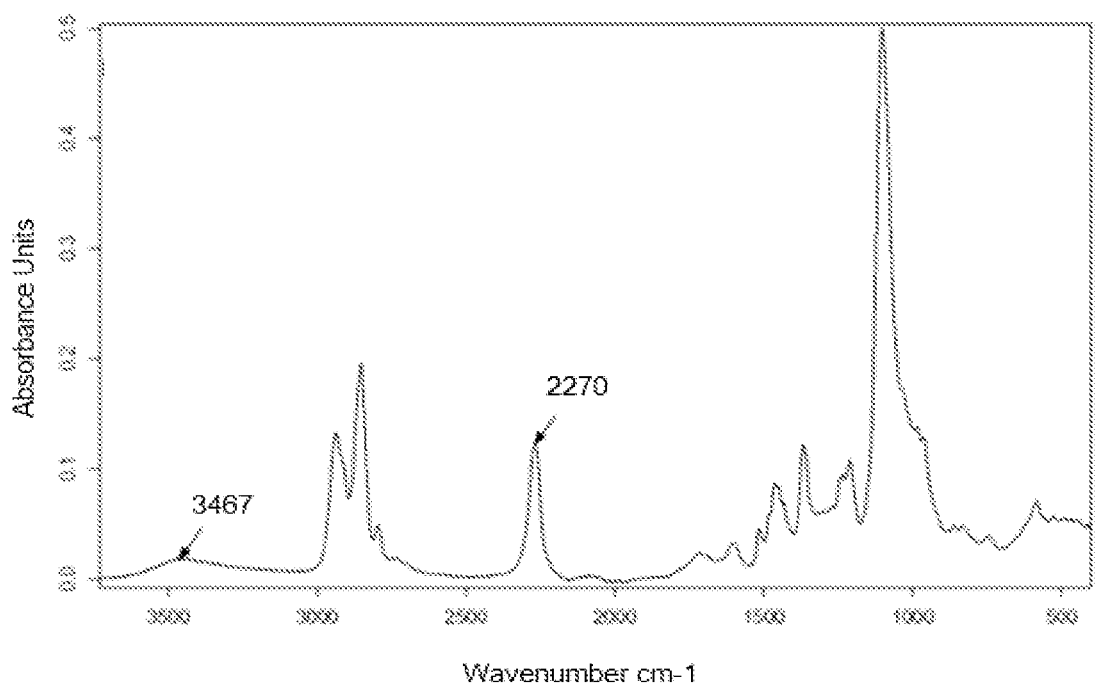
FIG. 6 shows the ATR-FTIR spectrum of an initial reaction mixture of the LBP of the Example 4 with hexamethylene diisocyanate and DBTL in tetrahydrofuran (THF) after THF evaporation at room temperature. The spectrum is a plot of the absorbance units versus wavelength ($cm^{-1}$).
Figure 7:
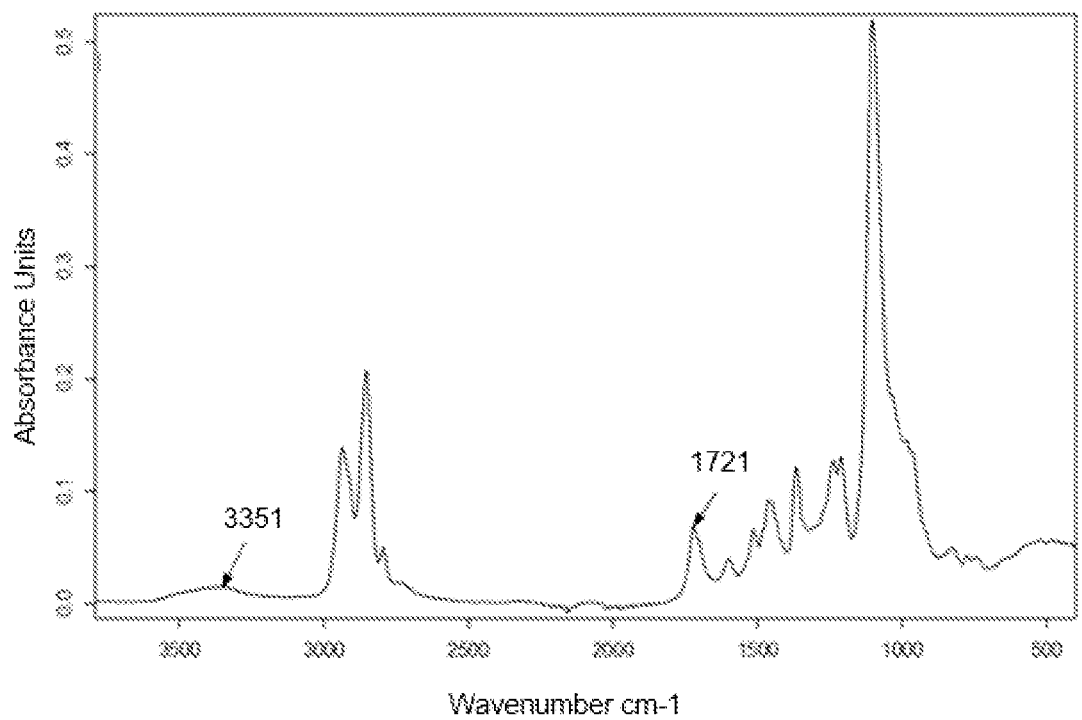
FIG. 7 shows the ATR-FTIR spectrum of the solvent-free end reaction product after the reaction, whose initial ATR-FTIR spectrum is given in FIG. 6, is over. The spectrum is a plot of absorbance units versus wavelength ($cm^{-1}$).

The LBP (0.368 g) of Example 4 having a hydroxyl number of 107 mg-KOH/g with hexamethylene diisocyanate (HDI) (0.059 g) in THF (5 mL) using dibutyltin dilaurate (DBTL) (3.90 mg) as a catalyst for 18 h, at reflux under stirring. Then, after solvent evaporation and cooling a room temperature a solid residue was obtained. At the beginning of the reaction, the stretching NCO band of HDI at 2270 $cm^{-1}$ and the OH band in LBP at 3467 $cm^{-1}$ can be clearly appreciated in the ATR-FTIR spectrum of the reaction mixture, as shown in FIG. 6. However, the NCO band of HDI at 2270 $cm^{-1}$ has completely disappeared in the end reaction product while a new band at 1721 $cm^{-1}$ appears corresponding to C=O stretching in the urethane group as shown in FIG. 7. Moreover, the OH band in LBP at 3467 $cm^{-1}$ has disappeared and a new band at 3351 $cm^{-1}$ corresponding to NH stretching in urethane moiety appears, as also shown in FIG. 7. All these data indicate that a polyurethane has been obtained showing the usability of the LBP of the present invention in the industrial synthesis of polyurethanes.

CITATION LIST

1. CN103772693
2. WO2013/113462
3. WO 2010/020903
4. Cateto et al. Optimization Study of Lignin Oxypropylation in View of the Preparation of Polyurethane Rigid Foams. *Industrial & Engineering Chemistry Research*, 2009, 48, 2583-2589.
5. Lora and Glasser. Recent Industrial Applications of Lignin: A Sustainable Alternative to Nonrenewable Materials. *Journal of Polymers and the Environment*, 2002, 10, 39-48.
6. ASTM E-1899-02

The invention claimed is:

1. A process to manufacture lignin-based polyols, which comprises:
    a) dissolving a lignin and an acidic catalyst in an organic solvent or a mixture of solvents, thereby obtaining a solution;
    b) adjusting a temperature of the solution obtained in step a) at a value from −15° C. to 60° C. under stirring;
    c) continuously adding an oxirane or a solution of an oxirane in an organic solvent or a mixture of solvents to the solution obtained in step b) at a flow rate from 0.01 to 1.0 L-oxirane/h/kg-lignin, thereby obtaining a first mixture,
    d) keeping the first mixture obtained in step c) after completion of the adding for a period of time sufficient for the lignin and the oxirane to react to produce lignin-based polyols;
    e) neutralizing the acidic catalyst by adding an amount of a base to the lignin-based polyols produced in step d) that is sufficient to neutralize the catalyst, thereby obtaining a second mixture; and
    f) isolating the lignin-based polyols from the second mixture obtained in step e);
    wherein the lignin-based polyols comprise a component unit derived from lignin, a component unit derived from an oxirane and a component unit derived from a cyclic-ether type solvent.

2. The process according to claim 1, wherein the oxirane is selected from the group consisting of ethylene oxide, propylene oxide, butylene oxide, epichlorohydrin, epibromohydrin and glycidol.

3. The process according to claim 1, wherein the acidic catalyst comprises boron trifluoride.

4. The process according to claim 1, wherein the acidic catalyst level is from 0.03 to 0.2 mol per mol OH in lignin.

5. The process according to claim 1, wherein the organic solvent of step a) or step c) is selected from the group consisting of tetrahydrofuran, tetrahydrofuran/acetonitrile, tetrahydrofuran/dichloromethane, tetrahydrofuran/trichloromethane, 1,4-dioxane, 1,4-dioxane/acetonitrile, 1,4-dioxane/dichloromethane, 1,4-dioxane/trichloromethane, tetrahydropyran, tetrahydropyran/acetonitrile, tetrahydropyran/dichloromethane, tetrahydropyran/trichloromethane, 2-methyltetrahydrofuran, 2-methyltetrahydrofuran/acetonitrile, 2-methyltetrahydrofuran/dichloromethane, 2-methyltetrahydrofuran/trichloromethane, and mixtures thereof.

6. The process according to claim 1, wherein the lignin concentration in the organic solvent or mixture of solvents in the solution obtained in step a) is from 0.1 g/L to the solubility of lignin in the organic solvent or mixture of solvents at the temperature in step b).

7. The process according to claim 1, wherein the oxirane/(hydroxyl moieties in lignin) molar ratio is from 0.2 to 60.

8. The process according to claim 1, wherein steps c) and d) are carried out at a temperature from −10 to 60° C.

9. The process according to claim 1, wherein the addition flow rate of the oxirane or the oxirane solution is from 0.02 to 0.7 L-oxirane/h/kg-lignin.

10. The process according to claim 1, wherein step d) is carried out for such needed time for having a conversion of oxirane higher than 90%.

11. The process according to claim 1, wherein the base in step e) is selected from the group consisting of trimethylamine, N,N-dimethylethylamine and triethylamine.

12. The process according to claim 1, wherein the amount of base in step e) is from 1 to 2 mol per mol of acidic catalyst.

13. The process according to claim 1, wherein the lignin-based polyols have a lignin content from 5 to 90 wt %.

14. The process according to claim 1, wherein the oxirane is selected from the group consisting of ethylene oxide, propylene oxide, butylene oxide, epichlorohydrin, epibromohydrin and glycidol; and the acidic catalyst comprises boron trifluoride.

15. The process according to claim 1, wherein the acidic catalyst comprises boron trifluoride and the acidic catalyst level is from 0.03 to 0.2 mol per mol OH in lignin.

16. The process according to claim 1, wherein:
    the oxirane is selected from the group consisting of ethylene oxide, propylene oxide, butylene oxide, epichlorohydrin, epibromohydrin and glycidol;
    the acidic catalyst comprises boron trifluoride; and
    the acidic catalyst level is from 0.03 to 0.2 mol per mol OH in lignin.

17. The process according to claim 1, wherein:
    the cyclic-ether type solvent is selected from tetrahydrofuran, tetrahydrofuran/acetonitrile, tetrahydrofuran/dichloromethane, tetrahydrofuran/trichloromethane, tetrahydropyran, tetrahydropyran/acetonitrile, tetrahydropyran/dichloromethane and tetrahydropyran/trichloromethane.

* * * * *